US006575063B1

United States Patent
Inaba

(12) United States Patent
(10) Patent No.: US 6,575,063 B1
(45) Date of Patent: Jun. 10, 2003

(54) BAR MATERIAL SUPPORTING DEVICE FOR AUTOMATIC LATHE

(76) Inventor: Tetsuo Inaba, 421-2, Ooaza Samukawa, Oyama-shi, Tochigi 329-0226 (JP)

( * ) Notice: Subject to any disclaimer, the term of this patent is extended or adjusted under 35 U.S.C. 154(b) by 0 days.

(21) Appl. No.: 09/673,153
(22) PCT Filed: Apr. 28, 2000
(86) PCT No.: PCT/JP00/02854
§ 371 (c)(1),
(2), (4) Date: Oct. 11, 2000
(87) PCT Pub. No.: WO00/66301
PCT Pub. Date: Nov. 9, 2000

(30) Foreign Application Priority Data

Apr. 28, 1999 (JP) .......................................... 11-121667

(51) Int. Cl.[7] .......................... B23B 13/00; B23B 15/00
(52) U.S. Cl. ............................... 82/127; 82/126; 82/162
(58) Field of Search .......................... 82/127, 126, 124, 82/162, 163, 170, 903

(56) References Cited

U.S. PATENT DOCUMENTS

| 3,927,585 A | * | 12/1975 | Austin .......................... 82/163 |
| 4,058,036 A | * | 11/1977 | Austin .......................... 82/163 |
| 4,100,827 A | * | 7/1978 | Flemming ................... 138/109 |
| 4,130,035 A | | 12/1978 | Langley |
| 4,292,864 A | * | 10/1981 | Cucchi et al. ................. 82/126 |
| 4,566,358 A | | 1/1986 | Ducanis |
| 4,628,779 A | * | 12/1986 | Louis ........................... 414/14 |
| 5,456,146 A | * | 10/1995 | Hubbard et al. ............ 279/133 |
| 5,927,169 A | * | 7/1999 | Hinson ......................... 82/127 |

FOREIGN PATENT DOCUMENTS

| JP | 4511911 | 5/1970 |
| JP | 4710313 | 3/1972 |
| JP | 51-7780 | 1/1976 |
| JP | 5531566 | 5/1980 |
| JP | 3270808 | 3/1991 |

* cited by examiner

Primary Examiner—Henry W. H. Tsai
(74) Attorney, Agent, or Firm—Notaro & Michalos P.C.

(57) ABSTRACT

The bar supporting apparatus (10) relates to an apparatus which is installed to be continuous to the main spindle (50) of the automatic lathe at the rear thereof and prevents the rotating bar (17) held by the chuck (51) of the main spindle (50) of the automatic lathe from oscillating to support the bar (17) so as to allow smooth rotation. The bar supporting apparatus (10) includes: the case (11); the fixing member (15) fixed on the external surface of the case (11); and the support (13) attached to the fixing member 15 to support the bar (17) in the case (11). The through hole into which the support (13) is inserted is formed on the side surface of the case (11). The fixing member (15) for fixing the support (13) is fixed on the external surface of the case (11) with the support (13) being inserted into the case (11) from the through hole.

13 Claims, 12 Drawing Sheets

BAR MATERIAL SUPPORTING DEVICE FOR AUTOMATIC LATHE

TECHNICAL FIELD

The present invention relates to a bar supporting apparatus for a lathe (which will be simply referred to as a bar supporting apparatus hereinafter) which supports a long circular work piece such as a bar or tube which is subjected to lathe work (it will be generically referred to as a bar hereinafter in the present specification) on a extended line of a main spindle of an automatic lathe.

BACKGROUND ART

This type of the bar supporting apparatus is provided in the vicinity of the automatic lathe and rotatably supports a portion of a long bar projecting from a head stock in order to prevent the bar from generating rotation oscillation. For example, as shown in FIG. 28, the prior art bar supporting apparatus 100 comprises: a case 111 having a predetermined length; a guide tube 113 whose diameter is slightly larger than an external diameter of a bar 117 which is to be supported in the case 111; and a hydraulic unit 114 which supplies a large amount of oil for supporting the bar 117 in the guide tube 113, and it causes the bar 117 to float in the guide tube 113 by the dynamic pressure of the oil involved by rotation of the bar 117 so that the bar is rotatably supported. It is to be noted that the bar 117 is gripped by a chuck 125 of a main spindle 124 of the automatic lathe so as to be processed. Since the rear end of the case 111 is sealed to avoid leakage of the oil in the bar supporting apparatus 100, the bar 117 is inserted after moving the front end side (the automatic lathe side) of the case 111 to the side with a supporting base 115 on the rear side as a supporting point. After inserting the bar 117 into the case 111, the case 111 is returned to its original position to be supplied to the main spindle 124 side (FIG. 29 and FIG. 30).

Here, although the oscillation of the bar 117 can be suppressed all the more as a gap between the external diameter of the bar 117 and the guide tube 113 is smaller, the bar 117 oscillates due to rotation during processing, and a narrow gap hence disadvantageously causes the bar 117 to come into contact with the guide tube 113 to generate heat. Therefore, the optimum gap between the internal diameter of the guide tube 113 and the external diameter of the bar 117 is determined to be approximately 1 mm in case of the bar having the external diameter of not more than 30 mm; approximately 2 mm in case of the bar having the external diameter of 31 mm to 65 mm; and approximately 3 mm in case of the bar having the external diameter of 66 mm to 69 mm. The quantity of the gap is also a problem of design, and these are approximate values. Thus, the guide tube 113 is replaced in accordance with the external diameter of the bar 117, or a guide tube having a small diameter is provided on the inner side of the guide tube 113 so as to cope with the bar 117 having a different external diameter.

In this case, in order to set an optimum gap between the guide tube 113 and the bar 117, the inner peripheral surface of the long guide tube 113 must be processed so as to obtain a straight axial center with the high accuracy, but it is very difficult to accurately process the inside of the long guide tube 113 with the current processing technology such as boring. Further, although the processing must be carried out with low-speed rotation depending on the bar 117 which is a target of processing, the dynamic pressure to be generated becomes small even if an appropriate gap is formed between the bar 117 and the guide tube 113 in this case, and the bar 117 does not float by oil but comes into contact with the guide tube 113 to cause the oscillation or noise.

In addition, a bend of the bar 117 is remedied by a straightening machine in the final step of the manufacturing process even if the bar 117 is made of a mill scale material or a polishing material and the bend is straightened to some degree, but the slight deflection is generated by its own weight and the like because it is actually long. Therefore, it is very difficult to inspect the bend of the bar 117, and the bend is often missed in the inspection even if the bar 117 is actually bent. The slightly bent bar 117 has to be supported by the bar supporting apparatus 100. Thus, the bar 117 oscillates more than necessary to come into contact with the guide tube 113 depending on the bend of the bar 117 which can not be found in the inspection, or the bar 117 may be deflected to be brought into contact with the guide tube 113 by the centrifugal force in the high-speed rotation, even if the bar 117 is not bent thereby generating oscillation or noise.

As a countermeasure, there is developed a bar supporting apparatus 100A which does not use the guide tube. As shown in FIGS. 31 and 32, the bar supporting apparatus 100A mounts on a counter 118 a plurality of supports 119 each consisting of a bearing having oil supplying means at predetermined intervals. An upper support 119A and a lower support 119B of the support 119 are disposed to the respective halves of the bearing 123, and the bar is inserted and removed by oscillating the upper support 119A around an upper frame pivot 120. The upper support 119A opens and closes by using a cylinder 122. The bearing 123 has a diameter slightly larger than that of the bar 117 and supports the bar 117 by generating the dynamic pressure between itself and the bar 117 with a large amount of oil being supplied to the bearing surface. Thus, since the oil supplied from the hydraulic unit to the bearing 123 of the support 119 spatters or leaks, the entire apparatus is covered with a large casing, thereby enlarging the size of the apparatus. It is to be noted that a plurality of the supports 119 are provided on the counter 118 at predetermined intervals. The apparatus is assembled so that all the upper and lower bearings 123 disposed to the multiple upper and lower supports 119A and 119B provided at predetermined intervals can have the axial centers accurately matched with each other.

However, since the bearing 123 is split in two to be supported by the upper and lower supports 119A and 119B and others, the shapes of components of the bearing 123 are complicated and hard to be processed. Further, it is very difficult to perform accurate centering on all the bearings 123 disposed to the upper and lower supports 119A and 119B due to an attachment error and others of the respective supports.

Moreover, when the gap between the bar 117 and the half bearing 123 is narrowed to approximately 1 mm or less, the bar 117 can be further rotated with no noise. However, since the upper and lower supports 119A and 119B are separately disposed, they can not be disposed to the same accurate straight axial center but attached with the respective axial centers being slightly shifted. Taking the axial center shift of the respective upper and lower supports 119A and 119B into consideration, it is extremely hard to reduce the gap between the bar 117 and the respective upper and lower supports 119A and 119B. This can not completely eliminate the noise depending on the situations.

Furthermore, in the bar supporting apparatus which supplies a large amount of oil and causes the bar to float by the supplied oil, the large amount of oil is used to enable rotation without noise even if the rotating bar oscillates, but the oil may disadvantageously spatter when the large amount of oil is supplied from an oil supplying device provided to the large hydraulic unit to the respective supports. Accordingly, it is necessary to manufacture an apparatus which is entirely covered with a cover so that the spattered oil is collected to be returned to the hydraulic unit for circulation, which may result in the expensive bar supporting apparatus.

SUMMARY OF THE INVENTION

It is an object of the present invention to provide a bar supporting apparatus which can accurately match axial centers of plural supports supporting a rotating bar with each other on the same axial center at the rear of a main spindle of an automatic lathe and which can be inexpensively manufactured.

To achieve this aim, the present invention provides a bar supporting apparatus for preventing a bar which is griped by a chuck of a main spindle of an automatic lathe and rotates at the rear of the main spindle from oscillating, the apparatus comprising: a case into which the bar is inserted along its longitudinal direction; and a support for supporting the bar, wherein a through hole into which the support is inserted is formed on the side surface of the case, and the support is inserted from the through hole into the case so that the support is fixed to the case with the outer surface of the case as a proof.

With this structure, when a plurality of through holes are formed to the case in the longitudinal direction thereof at predetermined intervals, the supports whose number is equal to that of the through holes can be attached. Therefore, the bar inserted into the case can be supported from one end to the other end at predetermined intervals. Further, when all reference faces of the case to which a plurality of supports are fixed are set out and a part from the axial center of the supporting portion of support for supporting the bar to the reference face of the support fixed to the case is set out, the axial centers of the supports supporting the bar among the plurality of supports attached in the longitudinal direction of the case can have the same axial center. This is extremely practically effective.

In addition, when the external diameter of the bar is changed, since the support is inserted from the through hole formed to the side surface of the case into the case to be fixed therein, only the support which is fitted to the external diameter of the bar has to be replaced, which extremely facilitates the operation. Thus, although replacement of the case in the prior art is very troublesome, only the supports have to be changed even if the external diameter of the bar is changed when the case is designed for allowing the bar processing maximum diameter of the automatic lathe, thereby greatly improving convenience.

Moreover, the support is inserted from the through hole on the side surface of the case into the case and the outer side of the support is fixed to the case. Although all of the outer periphery on the outer side of the support may not be fixed to the case in some cases, the support becomes like, e.g., a bamboo joint in the case and the bar is supported on the substantial center of the case. Therefore, it is possible to acquire the same effect as that obtained when the supporting portion of the bar is supported by the thick case in particular on the outer side in the circumferential direction, and the bar is supported with the high rigidity. Accordingly, even if the oscillating force is generated by rotation of the bar, it is transferred to the case through the support, and the entire case can normally suppress the force. As a result, although the force for oscillating the case acts, it can be suppressed in the most effective manner. Thus, it is possible to enable rotation without oscillation and noise with oscillating or deflection being prevented from occurring to the case when the bar is deflected to be rotated.

Among the plural supports attached to the case in the longitudinal direction thereof, since the axial centers of the supports supporting the bar can be matched with the same axial center with the high accuracy, a gap between the bar and the supporting portion supporting the bar can be reduced. When the gap is small, a large quantity of oil for generating the dynamic pressure does not have to be supplied between the bar and the supporting portion. Since it is enough if only a small amount of oil, e.g., lubrication oil is supplied, it is not necessary to provide the hydraulic unit and the like in particular. In addition, since the plural supporting portions are accurately arranged on the same axial center even though the gap is small, the bar can be lightly and smoothly rotated. Therefore, a quantity of heat to be generated is very small, and no seizure is generated even if the bar is rotated at a high speed. Additionally, it is possible to greatly minimize the vibration or oscillation of the bar when the bar rotates at a low speed to a high speed.

Moreover, the bar is not exposed to the outside because the rotating bar is supported in the case. This can avoid the possible danger that, for example, a cloth is intertwined with the rotating bar. Also, oil stained on the surface of the bar and the lubrication oil supplied to the supporting portion can be prevented from spattering to the outside of the case even if a cover and the like is not used. Thus, the bar supporting apparatus can be very safely used.

Here, the bar supporting apparatus is provided with a fixing member for fixing the support, and the fixing member is preferably fixed to the external surface of the case with the support being inserted from the through hole into the case.

In this case, it is easy to accurately finish the external surface of the case by cutting and the like. By using the external surface of the case as a proof/reference surface and positioning the bearing surface of the support, the bearing surfaces of all the supports can be arranged on the coaxial center and matched with the axial center of the case. This can facilitate setting out of a part from the external surface of the case to the bearing surface of the support even if the support is replaced. Therefore, the oscillation of the rotating bar can be minimized by reducing dimensional irregularities from the external surface of the case to the bearing surface of the supports. Consequently, the bar can rotate at a high speed to greatly improve the productivity.

In particular, it is preferable to form irregularities for positioning between the fixing member and the case. As the irregularities for positioning, it is preferable to use a positioning pin and a positioning hole or an engagement projection and a groove. In this case, when the positioning pin is inserted into the hole, the fixing member is positioned at a predetermined location of the case, and the axial centers of the respective supports can be further accurately and easily matched with each other. Further, in case of the projection and the groove, by only engaging the engagement projection on the inner surface of the fixing member with the groove on the outer surface of the support and then engaging the engagement projection with the groove on the external surface of the case, the fixing member and the support can be attached along the engagement projection of the case. This enables the support to be fixed to the case in a short time. Therefore, the bar supporting apparatus can be rapidly and extremely easily assembled. On the contrary, when the engagement projections are formed on the external surface of the case and that of the support and the groove is formed on the internal surface of the fixing member, the similar effect can be obtained. On the other hand, the internal surface of the fixing member, the external surface of the case and the external surface of the support may be smooth surfaces. In this case, since the engagement projection or the groove do not have to be formed, a number of processing steps of the bar supporting apparatus can be reduced as compared with the case where these members are formed.

In addition, it is preferable that the case has a tubular shape, the external surface of the support is bent with a curvature substantially equal to that of the external surface of the case and the internal surface of the fixing member is formed on a curved surface which is bent with a curvature substantially equal to that of the external surface of the case. In this case, since the external surface of the case having a tubular shape and the external surface of the support are fittingly fixed on the circumference of the cylinder with the same curvature, the axial center of the external surface of the case and that of the external surface of the support are matched with each other. Therefore, it is possible to set out the bearing surface of the support in such a manner that the axial centers of the bearing surfaces of the supports supporting the bar are matched with the axial center of the external surface of the case. Consequently, for example, when the external surface of the case is processed so as to provide the cylindrical straightness, the axial centers of the plural supports attached to the case in the longitudinal direction thereof and the axial center of the case can be matched with the same straight axial center. Therefore, the gap between the bar and the bearing surface of the support can be minimized, thereby greatly reducing the oscillation of the rotating bar.

On the other hand, the case may have a prismatic shape and the external surface of the support and the internal surface of the fixing member may have a shape substantially equal to that of the external surface of the case. In this case, the position from the external surface of the case to the bearing surface of the support can be easily set out. As a result, by processing the external surface of the case into a flat surface with the high accuracy, the axial center of the case and the centers of the opposed supports provided in the longitudinal direction at predetermined intervals can be matched with the same axial center. Therefore, the gap between the bearing surfaces of the opposed supports and the bar can be reduced, and the oscillation of the rotating bar can be significantly decreased.

In addition, the case may have a prismatic shape, and a through hole may be formed to an angular portion of the case. The external surface of the support may protrude with the substantially same shape as that of the external surface of the angular portion of the case, and the internal surface of the fixing member may be formed into a shape substantially fitted to the external surface of the angular portion of the case, i.e., a concave shape. In this case, the bearing surface of the support can be set out with the external surface forming the angular portion of the case as a reference. With this arrangement, for example, the center of the bearing surfaces of the opposed supports can be substantially matched with the axial center of the case from the angular portions. Therefore, by accurately finishing the external surface of the case, it is possible to accurately arrange the axial center of the case and the center of the opposed supports in the longitudinal direction at predetermined intervals on the same axial center. This can reduce the gap between the bar and the supports, and the oscillation of the bar can be greatly suppressed.

Here, in the bar supporting apparatus, it is preferable that the through holes are formed on the opposed side surfaces of the case and the respective supports are inserted from these through holes into the case so that the bar can be supported from the both sides. In this case, with the accurately finished external surface of the case being used as a reference, the rotating bar can be accurately supported by the opposed supports on the internal surface of the case. Consequently, the axial center of the external surface of the case can be matched with the axial centers of the supporting portion to form the supporting portion even if the supports are replaced. Therefore, when the supports are moved by the power of, for example, a pneumatic cylinder and the like, the supporting portion can be automatically opened/closed. Even if the oscillation of the bar having a different external diameter is supported, the supports associated with the bar can be rapidly substituted, thereby significantly improving the convenience.

In particular, the bar can be automatically supplied from an opening by providing an opening which is formed along the longitudinal direction of the case and notched so as to enable insertion and removal of the bar, a bar pedestal installed at a position slightly lower than the position where the bar is supported by the supports, and a supplying device capable of mounting the bar on the bar pedestal. Therefore, the convenience of the bar supporting apparatus can be greatly improved. Further, since the bar pedestal provides a small gap below the bar when the bar is supported by the supports, it is possible to prevent the bar from contacting with the bar pedestal even if the rotating bar oscillates in some measure.

Moreover, the through holes may be formed on the opposed side surfaces of the case, and the supports may be inserted into the case from one through hole to the other through hole. Also, the supporting portion into which the bar is inserted may be formed to the supports. In this case, the supports can be simply manufactured in particular. This can cause the axial center of the external surface of the case to be matched with the axial center of the supporting portion by only inserting the support from one through hole to be fixed. Therefore, a number of processing steps of the bar supporting apparatus can be greatly reduced to enable the inexpensive manufacture.

In addition, the through hole may be formed on one side surface of the case so that the support can be inserted from the through hole into the case, and the supporting portion into which the bar is inserted may be formed to the support. In such a case, the support can be further simply manufactured. As a result, the axial center of the external surface of the case can be matched with the axial center of the supporting portion by only inserting the support from the through hole to be fixed, and a number of processing step of the bar supporting apparatus can be significantly reduced to enable the inexpensive manufacture.

Further, in this case, there may be provided on the internal surface of the case at a position opposed to the through hole a fixing portion consisting of a recession to which an end portion of the support inserted into the case is fitted. According to this structure, the fixing portion can be formed with the equal accuracy as the external surface of the case, and the support can be positioned by the fixing portion.

Furthermore, a plurality of through holes may be formed in parallel to the longitudinal direction of the case. This can facilitate processing of the case.

Moreover, a plurality of through holes may be formed on the side surface of the case along the longitudinal direction thereof, and an angle of each through hole seen from the center of the case may be shifted from each other. The respective supports may be inserted from these through holes into the case to support the bar. In this case, the bar inserted into the case can be supported by the support at a position shifted in the circumferential direction. This can avoid the inconvenience such that the end of the support having the lower strength is deformed due to the stress caused by the oscillation of the rotating bar. Therefore, the support can be prevented from being damaged, thereby attaining the very long duration of life.

It is preferable that an engagement projection is formed on one of the internal surface of the fixing member or the external surface of the case and the external surface of the support and a groove engaging with the engagement projection is formed on the other of them. For example, the engagement projection is formed on the internal surface of the fixing member, and the groove engaging with the engagement projection is formed on the external surface of the case. Also, the groove engaging with the engagement projection is formed on the external surface of the support.

Further, an elastic member may be preferably provided between the fixing member and the support. In this case, an impetus can be given to the bar inserted to the supporting portion in a direction of the axial center of the case. Consequently, for example, even if the bar having a relatively large diameter and a curve and the like is bent and rotates to generate a large oscillation, the force to give impetus of an impetus giving member can suppress the large oscillation of the bar. Therefore, the vibration or the noise of the rotating bar can be prevented from occurring.

BEST MODE FOR EMBODYING THE INVENTION

Figure 1:
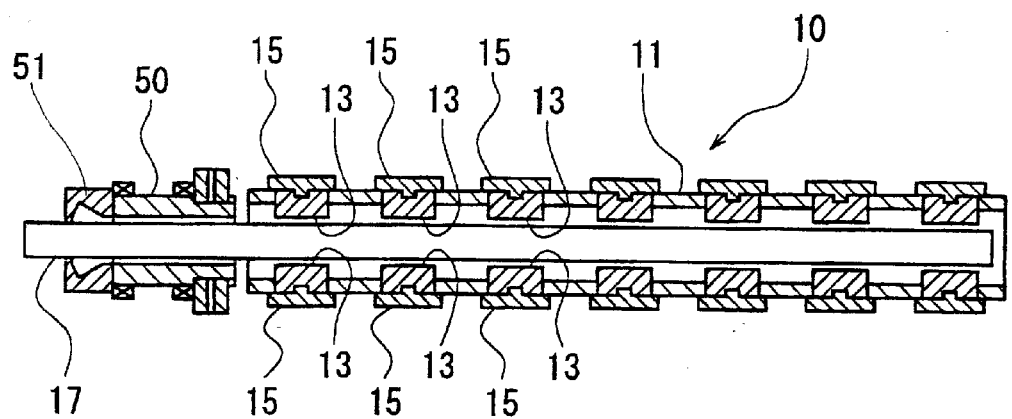
FIG. 1 is a central longitudinal sectional plane view showing a bar supporting apparatus according to the present invention.
Figure 2:
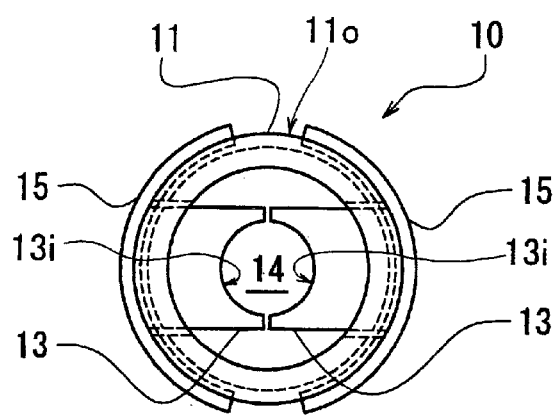
FIG. 2 is a front view of the bar supporting apparatus according to the present invention.
Figure 3:
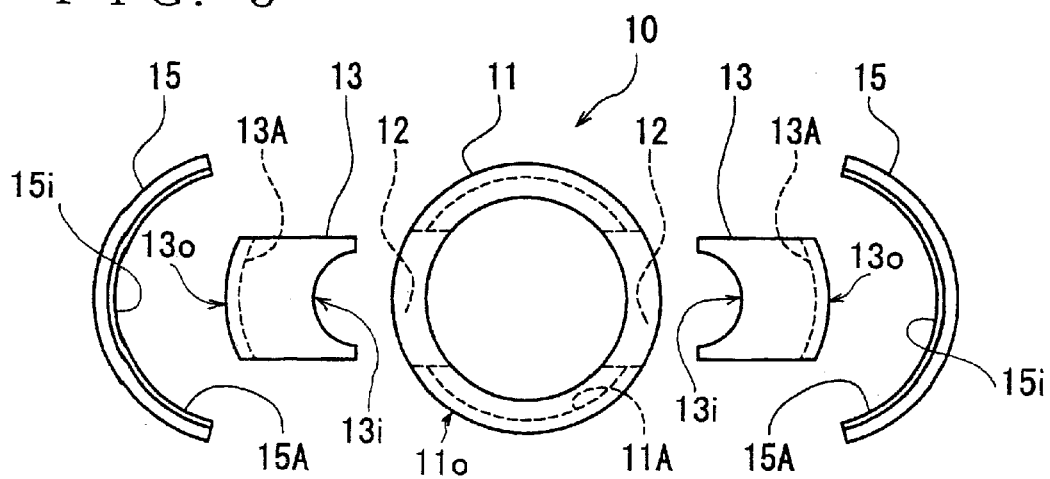
FIG. 3 is an exploded front view of the bar supporting apparatus according to the present invention.
Figure 4:
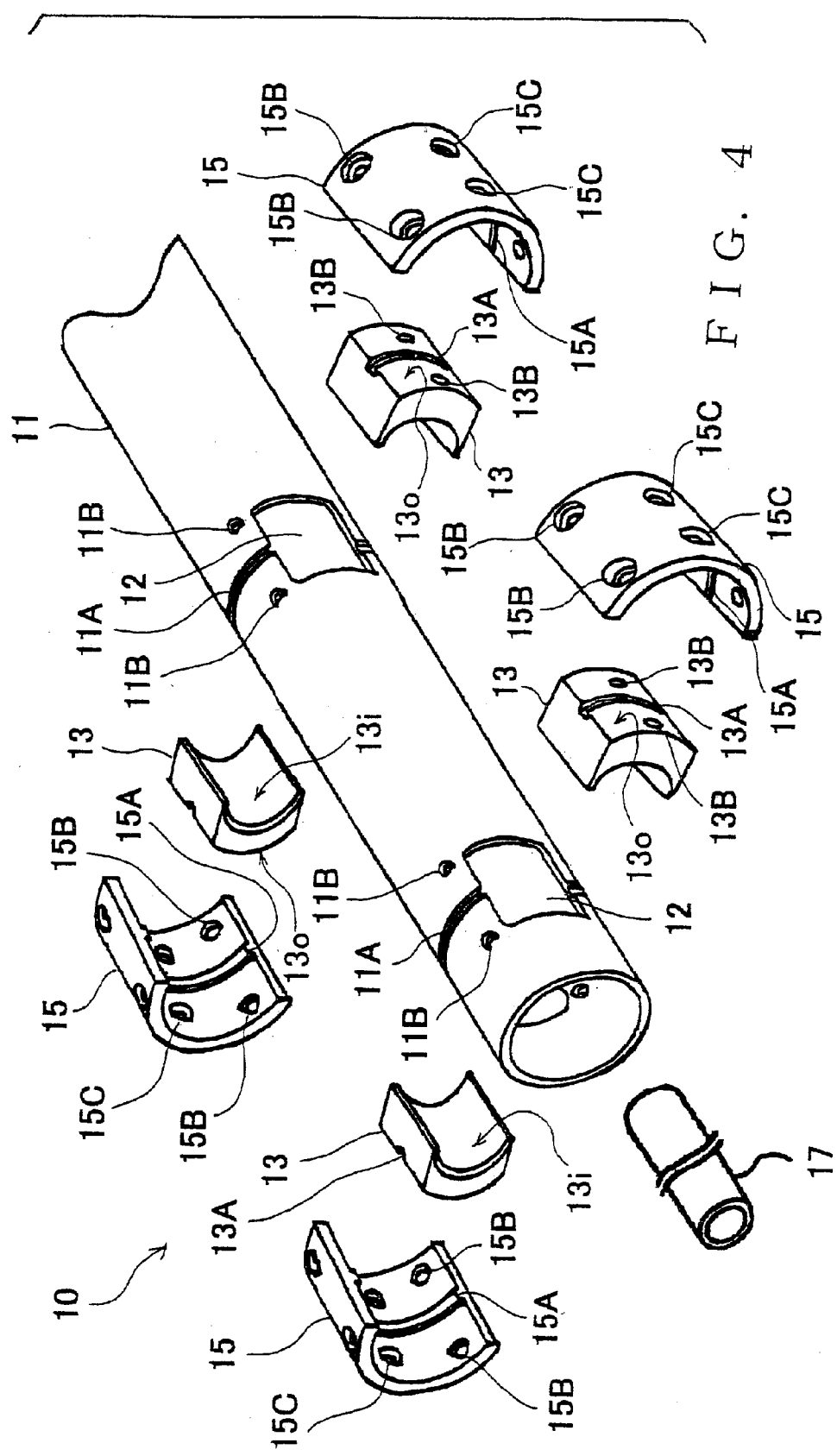
FIG. 4 is an exploded perspective view of the bar supporting apparatus according to the present invention.
Figure 5:
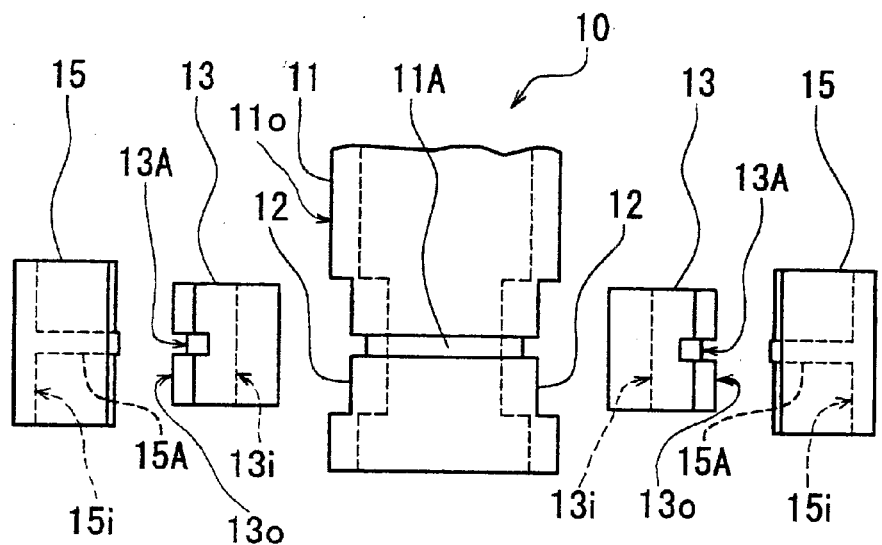
FIG. 5 is an exploded plan view of the bar supporting apparatus according to the present invention.

The preferred embodiments according to the present invention will now be described in detail with reference to the accompanying drawings. FIGS. 1 to 5 show an embodiment of a bar supporting apparatus according to the present invention. The bar supporting apparatus 10 is installed in the rear of a main spindle 50 of an automatic lathe so as to be connected thereto. The bar supporting apparatus 10 suppresses oscillation of a rotating bar 17 gripped by a chuck 51 of the main spindle 50 of the automatic lathe and supports it to allow smooth rotation thereof. Further, the bar supporting apparatus 10 includes: a case 11; fixing members 15 fixed to an external surface ho of the case 11; and supports 13 which are attached to the fixing members 15 and support the later-described bar 17 in the case 11.

The case 11 has a long cylindrical shape with a predetermined thickness and made of a metal, and its length is determined to correspond to, for example, that obtained by subtracting the length of the main spindle 50 of the automatic lathe from the bar 17 in this embodiment. The length of the case 11 is appropriately determined on the designing step and the external surface (outer peripheral surface) of the same can be readily finished into a straight cylindrical shape having a perfect circle with the high accuracy by a lathe and the like. Substantially rectangular through holes 12 piercing the case 11 in the radial direction are formed on one surface side of the case 11, and through holes 12 having the same shape and size are formed on the opposed other surface side.

In this case, the both through holes 12 are so formed as to be opposed to the axial center of the case 11 and provided at predetermined intervals in the longitudinal direction of the case 11. A number of through holes 12 is not restricted to any particular figure, but they are appropriately provided at equal intervals in accordance with the length of the case 11. A number of these through holes 12 is calculated and determined based on the length of the case 11 and others. These are the problems determined in the designing step. For example, the interval between the through holes 12 is shortened in case of a flexible bar 17.

In addition, grooves 11A having a predetermined width and a predetermined depth are provided on the external surface of the case 11, and the grooves 11A are formed in the circumferential direction around the axial center of the case 11 and at a substantial center of the through holes 12. The groove 11A is formed such that it can be easily engaged with a later-described engagement projection 15A provided on an internal surface 15i of the fixing member 15. It is to be noted that reference numeral 11B denotes a screw hole for screwing the later-described fixing member 15 to the case 11.

In addition, the fixing member 15 is made of metal having a predetermined thickness, and the internal surface thereof is formed into a concave surface bent with a curvature which is matched with that of the external surface of the case 11. This fixing member 15 has a shape slightly larger than the through hole 12 formed to the case 11. The engagement projection 15A is formed on the internal surface of the fixing member 15. This engagement projection 15A is formed on the internal surface of the fixing member 15 so as to protrude thereon and constituted in the circumferential direction around the axial center of the fixing member 15 with a curvature matched with that of the external surface of the case 11. That is, the internal surface of the fixing member 15 can be matched with the external surface of the case 11, and the engagement projection 15A provided to the fixing member 15 can be engaged with the groove 11A formed on the case 11 with the internal surface of the fixing member 15 being fitted to the external surface of the case 11. It is to be noted that reference numeral 15B designates a mounting hole with a counter boring for inserting therethrough a bolt for screwing the fixing member 15 to the case 11, and reference numeral 15C denotes a mounting hole with a counter boring for inserting therethrough a bolt for screwing the fixing member 15 to the support 13.

On the other hand, the support 13 supports the bar 17 so as to prevent the rotating bar 17 from largely oscillating, and the bearing surface thereof is formed into a substantially semicircular shape with a curvature radius slightly larger than that of the bar 17. Also, its external surface is formed into a bent shape with the substantially same curvature as that of the external surface of the case 11. In this case, the external surface 13o and the bearing surface 13i of the support 13 are so formed as to have the same center of curvature. Further, the groove 13A having a predetermined width and a predetermined depth is formed on the external surface 13o of the support 13. The groove 13A is formed along the circumferential direction around the axial center of the bent support 13 and can be engaged with the engagement projection 15A provided to the fixing member 15. Although the support 13 is composed of a bearing metal or a sintered material, it may be made of any other baring material in some cases. It is to be noted that reference numeral 13B denotes a screw hole for screwing the fixing member 15 to the support 13.

The groove 13A provided to the support 13 is engaged with the engagement projection 15A of the fixing member 15, and a non-illustrated bolt is inserted from the mounting hole 15C provided to the fixing member 15 into the screw hole 13B formed to the support 13 so that the support 13 and the fixing member 15 are fixed. This causes the internal surface of the fixing member 15 and the bearing surface of the support 13 to have the same axial center and to be fixed with the accurate dimension.

Subsequently, the support 13 is inserted into each through hole 12 formed to the case 11, and the engagement projection 15A provided to the fixing member 15 is engaged with the groove 11A formed to the case 11. A non-illustrated bolt is inserted from the mounting hole 15B provided to the fixing member 15 into the screw hole 11B provided on the case 11, thereby fixing the fixing member 15 and the case 11. This forms a supporting portion 14 having a diameter slightly larger than that of the bar 17 between the bearing surfaces of the opposed supports 13.

The fixing member 15 whose internal surface is formed into a concave surface with a curvature substantially equal to that of the external surface of the case 11 is attached, and the support 13 whose external surface is bent with the substantially same curvature as that of the external surface of the case 11 is provided on the inner side of the fixing member 15. Therefore, the external surface of the support 13 can be flush with the external surface of the case 11. Consequently, axial centers of a plurality of the supporting portions 14 formed by the opposed supports 13 attached to the case 11 can be accurately arranged on the same axial center.

In this manner, since the supports 13 are disposed by using as a reference surface/proof the external surface of the case 11 finished by cutting and the like to have the straight cylindrical shape with a complete circle, the axial centers of the respective supporting portions 14 formed from the external surface of the case 11 by the opposed supports 13 can be matched with the same straight axial center with the high accuracy. By finishing the external surface of the case 11 with the lathe and the like so as to have straightness and a complete circuit with the high accuracy, the accuracy of concentricity of the axial centers of the respective supporting portions 14 provided in the longitudinal direction of the case 11 at predetermined intervals can be greatly improved. As a result, the gap between the bar 17 and the supporting portion 14 can be reduced, which can further suppress the oscillation of the rotating bar 17 while supporting the bar 17.

Figure 6:
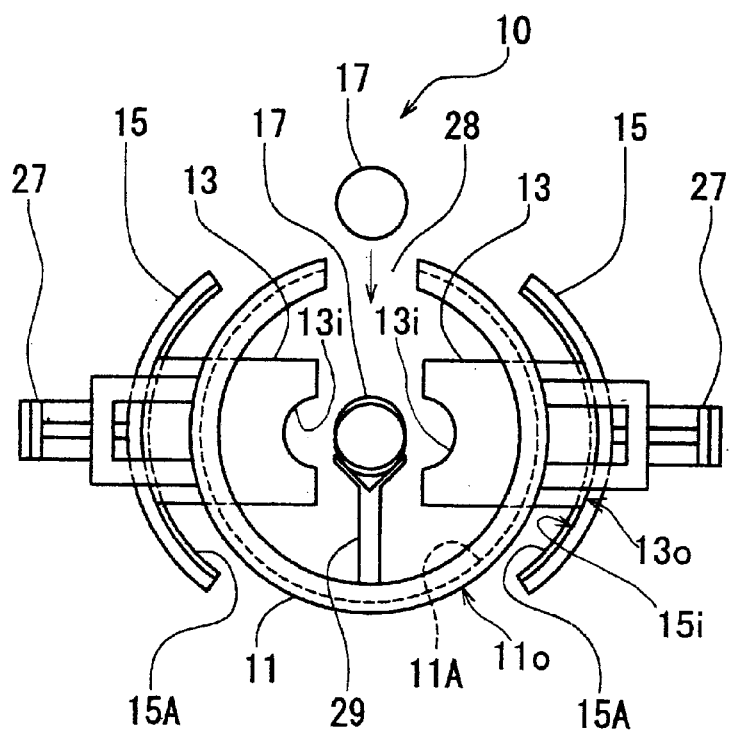
FIG. 6 is a front view of the bar supporting apparatus, showing an example of automatic supply of a bar.
Figure 7:
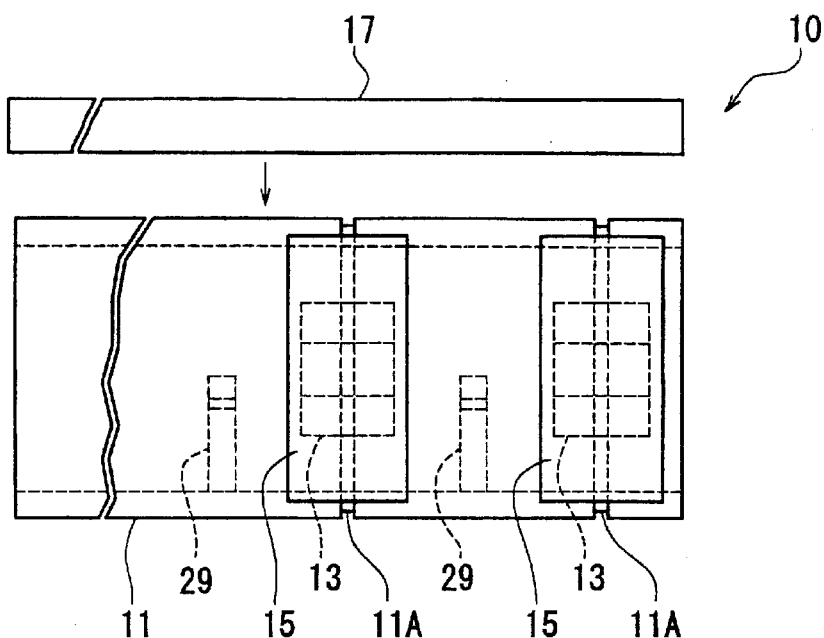
FIG. 7 is a side view of the bar supporting apparatus illustrated in FIG. 6.

Here, description will be given on an example of a device for automatically supplying the bar 17 with reference to FIGS. 6 and 7. In this case, the fixing member 15 and the support 13 are fixed by a screw in advance, and a cylinder 27 is attached to the fixing member 15. A bar pedestal 29 is provided between the respective supports 13 in the case 11, and the bar pedestal 29 is provided below the bar with a small gap therebetween with the bar 17 being supported by the supports 13. Consequently, the bar 17 does not come into contact with the bar pedestal 29 even if the rotating bar 17 oscillates to some degree.

The operation for supplying the bar 17 with the above structure will be explained. It is to be noted that an opening 28 notched for allowing insertion of the bar 17 is formed on the top face of the case 11, and it is determined that the bar 17 is inserted from the opening 28 into the case 11 by a non-illustrated supplying device. Further, the opposed respective supports 13 are estranged from each other by the cylinder 27, and the bar 17 is inserted from the opening 28 into the case 11 by the automatic supplying device. After the bar 17 is mounted on the bar pedestal 29 provided in the case 11 by the automatic supplying device, the respective fixing members 15 is pressed against the case 11 by the cylinder 27.

The internal surface 15*i* of the fixing member 15 formed on the surface bent with the curvature equal to that of the external surface of the case 11 having straightness and a complete circle is pushed against and fitted to the external surface 11*o* of the case 11 by the cylinder 27. Further, the external surface of the support 13 having the same curvature as the external surface of the case 11 is fixed on the internal surface of the fixing member 15. The bearing surface of the support 13 is formed with the same axial center as the external surface of the support 13 so that the axial center of the supporting portion 14 and that of the case 11 can be accurately matched with the same axial center. In this manner, since the axial center of the case 11 can be matched with the axial center of each supporting portion 14 in the bar supporting apparatus 10, even if the bar 17 is automatically supplied for example, the axial center of each supporting portion 14 can be accurately matched with the axial center of the case 11 to minimize the oscillation of the bar 17 with the external surface of the case 11 being used as a reference.

Figure 8:
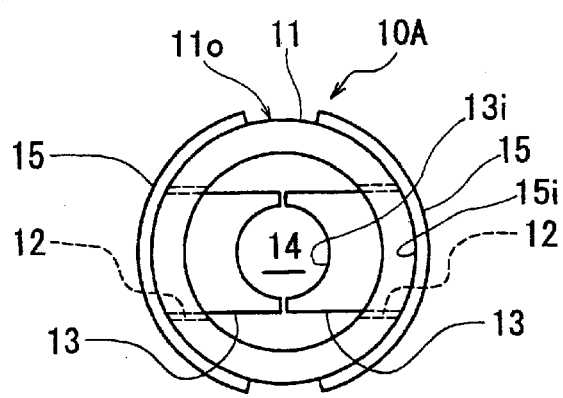
FIG. 8 is a front view of another bar supporting apparatus.
Figure 9:
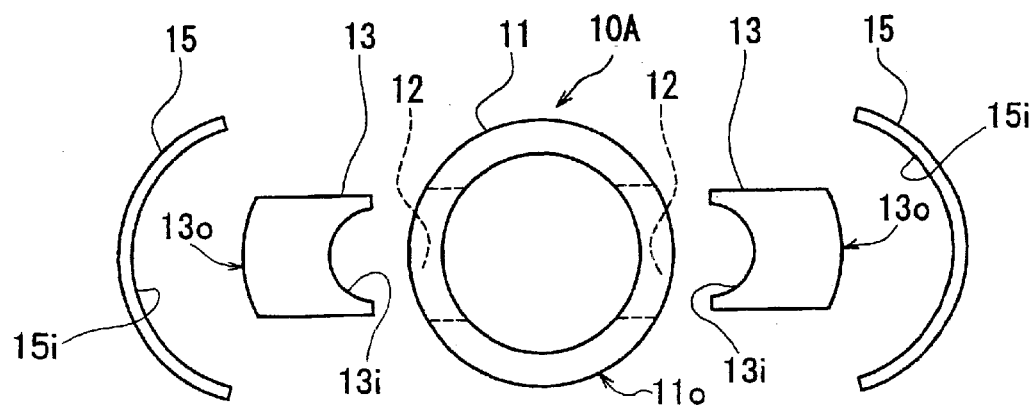
FIG. 9 is an exploded front view of the bar supporting apparatus illustrated in FIG. 8.

Another bar supporting apparatus 10A will now be described with reference to FIGS. 8 and 9. In this case, based on the bar supporting apparatus 10 shown in FIGS. 1 to 5, the groove 11A formed on the external surface of the case 11, the groove 13A formed on the external surface of the support 13 and the engagement projection 15A formed on the internal surface of the fixing member 15 are eliminated, and remaining parts are similarly configured. In such a case, the support 13 can be readily attached with the external surface of the case 11 being used as a reference, and the axial center of each supporting portion 14 formed by the supports 13 opposed to the axial center of the case 11 can be matched with the axial center of the case 11 with the high accuracy.

In this bar supporting apparatus 10A, the fixing member 15 and the support 13 are attached with the external surface of the case 11 which is accurately finished to have straightness and a complete circle being used as a reference without providing the groove 11A formed on the external surface of the case 11, the groove 13A formed on the external surface of the support 13 and the engagement projection 15A formed on the internal surface of the fixing member 15 in the bar supporting apparatus 10 shown in FIGS. 1 to 5. This can reduce a number of processing steps for manufacturing the bar supporting apparatus 10A, and the axial center of the case 11 similar to the above and that of the supporting portion 14 formed by the opposed supports 13 can be matched with the highly accurate axial center of the case to support the bar 17 with the minimum oscillation of the bar 17.

Figure 10:
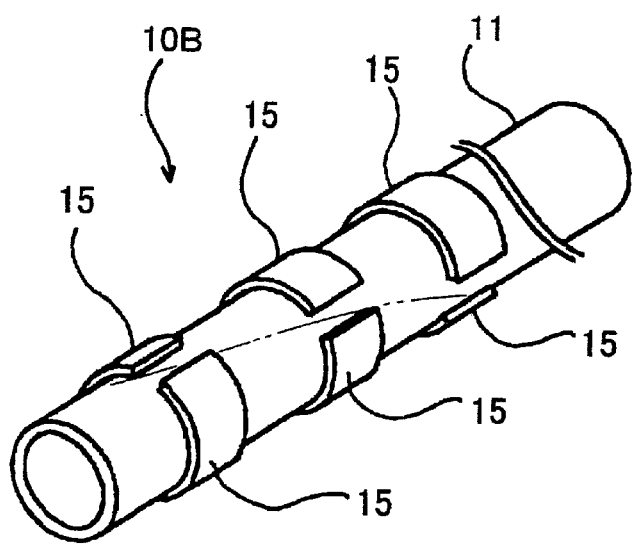
FIG. 10 is a perspective view of still another bar supporting apparatus.

Still another bar supporting apparatus 10B will now be described with reference to FIG. 10. In this case, based on the bar supporting apparatus 10 illustrated in FIGS. 1 to 5, the through holes 12 and the fixing holes 11B formed in the longitudinal direction of the case 11 at predetermined intervals are shifted in the circumferential direction at a predetermined angle seen from the center of the case 11. The remaining parts are similarly constituted as the bar supporting apparatus 10 shown in FIGS. 1 to 5. The support 13 is attached to the fixing member 15 disposed to the external surface of the case 11. As a result, the supports 13 can be attached with each gap between the adjacent opposed supports 13 provided in the longitudinal direction of the case 11 being shifted in the circumferential direction, and the bar 17 can be supported with the adjacent part of the opposed supports 13 being shifted in the circumferential direction of the supporting portion 14.

In this manner, the supports 13 supporting the bar 17 are shifted at a predetermined angle in the circumferential direction seen from the center of the case 11 and provided at predetermined intervals in the longitudinal direction of the case 11, and the axial center of the bearing surface of each support 13 and the axial center of the external surface of the case 11 are matched with the same axial center. Therefore, the adjacent part of the opposed supports 13 can be shifted in the circumferential direction of the supporting portion 14 seen from the center of the case 11. This can match the axial center of each supporting portion 14 formed by the opposed supports 13 with the axial center of the accurate case 11 with the external surface of the case 11 being used as a reference. Thus, it is possible to prevent only the part of each supporting portion 14 with the low strength from being worn away and avoid deformation of the end portion of each support 13 with the low strength due to friction caused by the oscillation of the bar 17.

Figure 11:
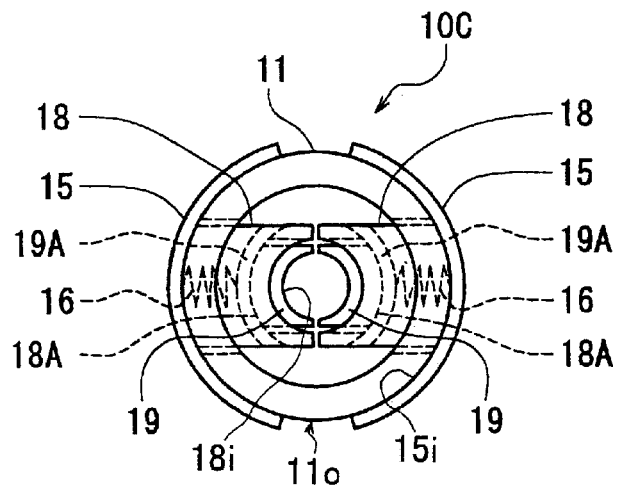
FIG. 11 is a front view of yet another bar supporting apparatus.
Figure 12:
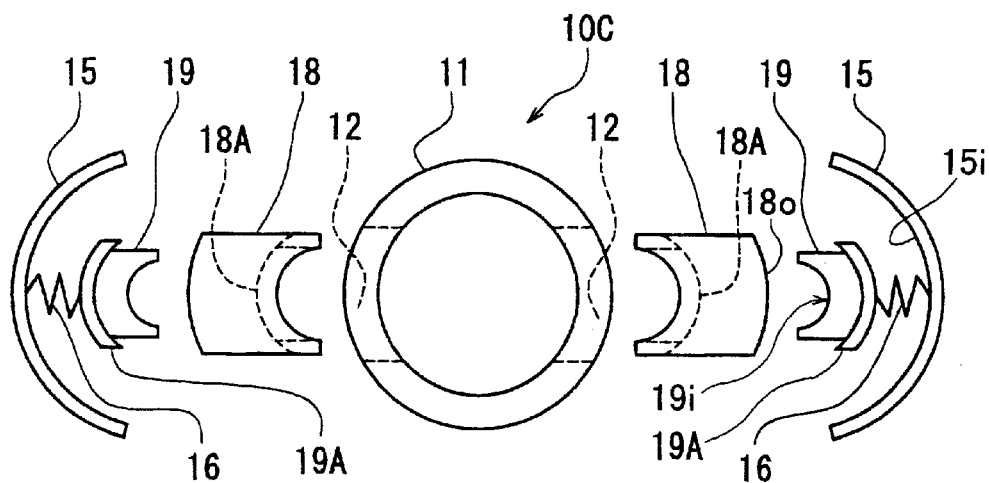
FIG. 12 is an exploded front view of the bar supporting apparatus depicted in FIG. 11.
Figure 13:
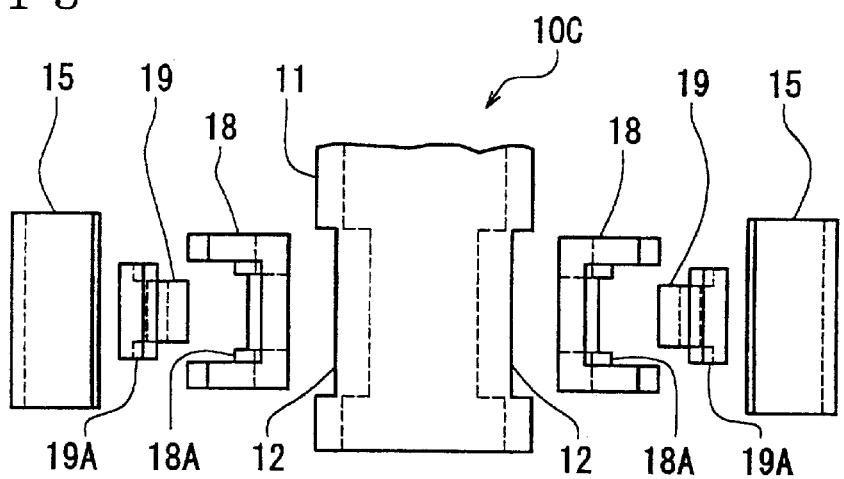
FIG. 13 is an exploded plan view of the bar supporting apparatus illustrated in FIG. 11.

A yet further bar supporting apparatus 10C will be described with reference to FIGS. 11 to 13. In this case, a support 19 is provided on the inner side of the fixing member 15 through a coil spring 16 as an elastic member, and the support 19 is constituted so as to be constantly pushed against the inner side of the case 11 by the coil spring 16. A collar 19A is provided to the support 19, and the external surface of the support 19 is bent with the substantially same curvature as the internal surface of the collar 19A and fixed by a non-illustrated screw. Further, the bearing surface of the support 19 has a bent surface with the curvature radius which is slightly larger than that of the external surface of the bar 17.

A tubular guide member 18 is provided around the support 19, and the support 19 can move toward the axial center of the case 11 in the guide member 18 along the radius direction. As similar to the above-described support 13, the external surface of the guide member 18 is bent with the substantially same curvature as the external surface of the case 11 and fixed by a non-illustrated screw as similar to the above-mentioned fixing member 15 to flush with the external surface of the case 11. In addition, the internal surface 18*i* of the guide member 18 is largely bent more than the bearing surface 19*i* of the support 19. A stopper 18A is formed and provided with the same axial center as the external surface of the guide member 18 at a predetermined middle position between the external surface 18*o* and the internal surface of the guide member 18. The external surface of the stopper 18A is bent with the curvature substantially equal to that of the internal surface of the collar 19A, and the support 19 does not further move toward the axial center of the case 11 when the collar 19A comes into contact with the stopper 18A of the guide member 18.

That is, the support 19 provided inside of the guide member 18 fixed to the fixing member 15 is pushed by the coil spring 16 in this state, and the guide member 18 is inserted from the through hole 12 to cause the external surface of the guide member 18 to match with the external surface of the case 11 so that they are fixed on the inner surface of the fixing member 15. The supporting portion 14 associated with the bar 17 is formed on the bearing surfaces of the both supports 19 opposed to the case 11. Any other part is similarly constituted as that in the bar supporting apparatus 10 shown in FIGS. 1 to 5.

Since the coil spring 16 is provided between the fixing member 15 and the support 19 so that the support 19 can move toward axial center of the case 11 along the radial direction without restraint, the bar 17 can be pushed with a predetermined pressure when the rotating bar 17 oscillates and comes into contact with the support 19. As a result, even if the bent bar 17 is used and oscillates beyond the shape of the supporting portion 14, the impetus of the support 19 can suppress the oscillation of the bar 17 to be supported.

Figure 14:
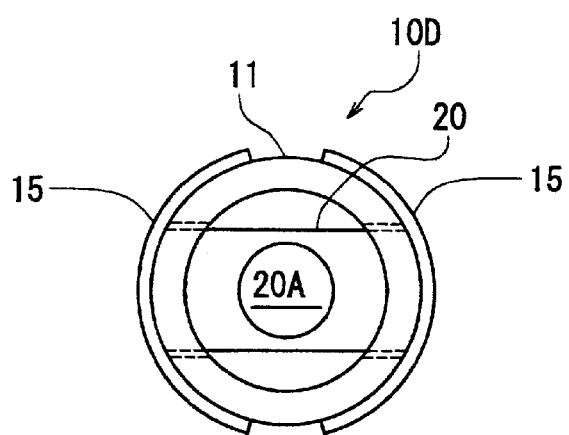
FIG. 14 is a front view of a further bar supporting apparatus.
Figure 15:
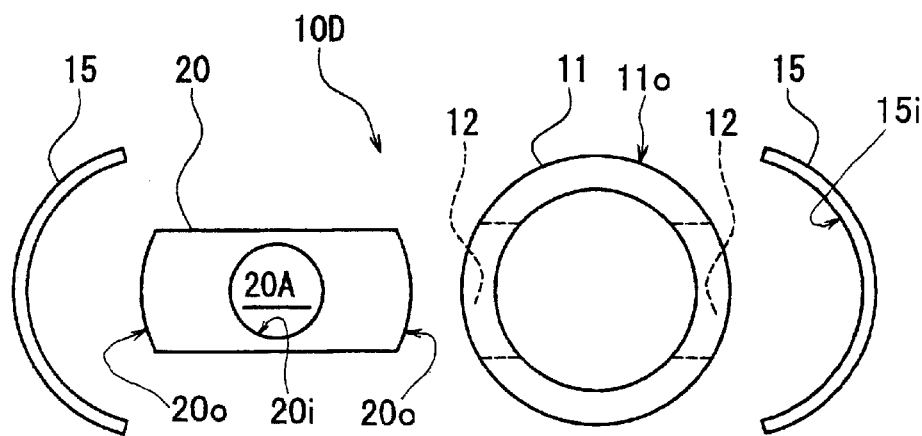
FIG. 15 is an exploded front view of the bar supporting apparatus depicted in FIG. 14.

Another bar supporting apparatus 10D will now be described with reference to FIGS. 14 and 15. In the drawings, reference numeral 20 denotes a support; 20A, a supporting portion; and 15, a fixing member. Both external surfaces 20o of the support 20 are bent with the curvature substantially equal to that of an external surface 11o of the case 11, and the supporting portion 20A is formed in the center of the support 20. That is, the supporting portion 20A similarly consisting of a bearing surface 20i as the supporting portion 14 is formed in the center of the support 20, and the support 20 is formed such that the axial center of the both external surfaces and that of the supporting portion 20A are matched with the same axial center. The support 20 is inserted from one through hole 12 to the other through hole 12 of the case 11, and the fixing member 15 is fixed by a non-illustrated screw from the both side surfaces of the case 11.

In this manner, there is provided the support 20 having the external surface which is substantially the same as the external surface of the case 11, and the external surface of the support 20 is matched with the axial center of the support 20A. The support 20 is inserted into the through holes 12 formed on the both sides of the case 11 and fixed by the fixing member 15, thereby matching the axial center of each supporting portion 20A with the axial center of the case 11. This enables the bar 17 to be supported by the respective supporting portions 20A whose axial centers are accurately matched with each other. It is to be noted that the support may be replaced with the support 20 forming the supporting portion 20A associated with the external diameter of the bar 17 when supporting the bar 17 having a different external diameter.

Figure 16:
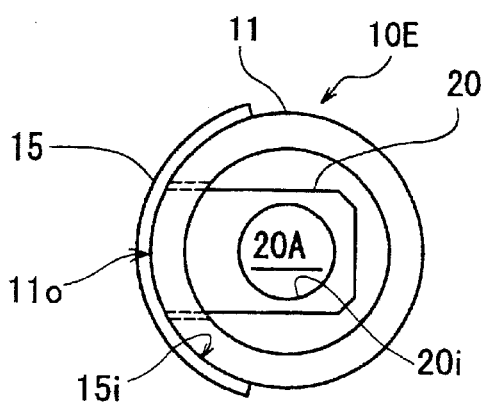
FIG. 16 is a front view of a still further bar supporting apparatus.
Figure 17:
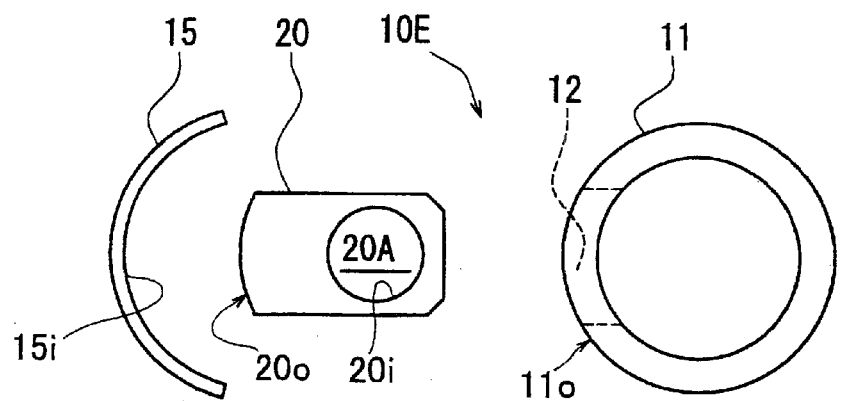
FIG. 17 is an exploded front view of the bar supporting apparatus depicted in FIG. 16.
Figure 18:
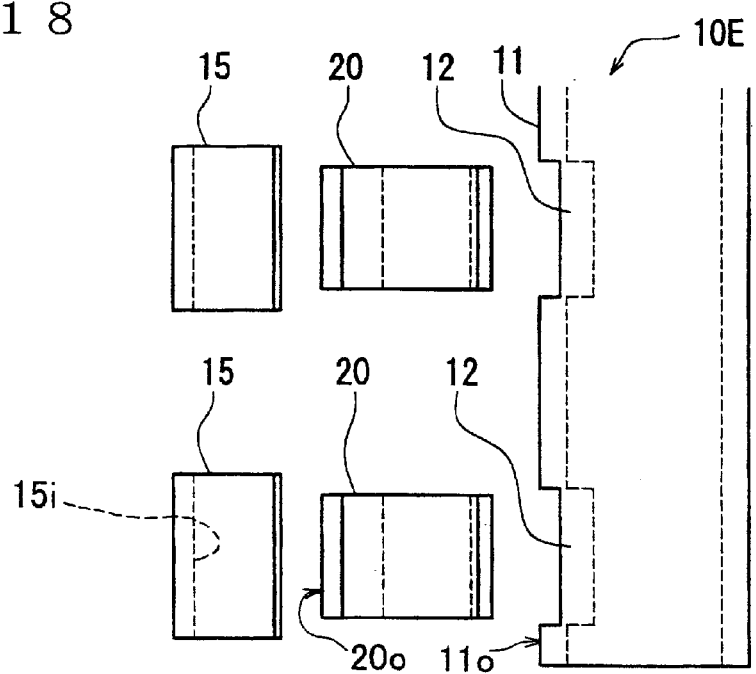
FIG. 18 is an exploded plan view of the bar supporting apparatus illustrated in FIG. 16.

Still another bar supporting apparatus 10E will now be described with reference to FIGS. 16 to 18. In this case, in the bar supporting apparatus 10E, the through holes 12 formed on one side surface of the case 11 in the bar supporting apparatus 10D illustrated in FIGS. 14 and 15 are eliminated and through holes 12 are formed on only the other side surface of the case 11 at predetermined intervals. Additionally, one side of the support 20 is made shorter than the through hole 12 formed on the case 11 so as not to come into contact with the case 11. Any other part is constituted as similar to that in the bar supporting apparatus 10D shown in FIGS. 14 and 15. That is, the fixing member 15 to which the external surface of the support 20 is secured is fixed on the side surface of the case 11 on the through hole 12 side by a non-illustrated screw. In this case, the axial center of the external surface of the case 11, the axial center of the internal surface of the fixing member 15, the axial center of the external surface of the support 20 and the axial center of the supporting portion 20A are similarly matched with each other, and the axial center of the supporting portion 20A formed to each support 20 is accurately matched with the same axial center to enable fixation. Consequently, the supporting portion 20A can support the bar 17 so as to minimize the oscillation of the bar 17. Therefore, a number of manufacturing steps of the bar supporting apparatus 10E can be further reduced.

Figure 19:
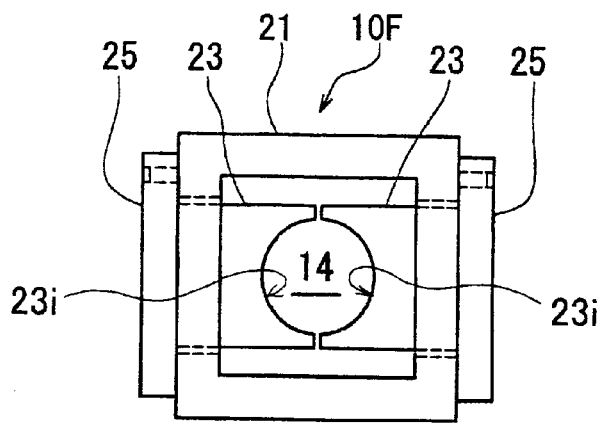
FIG. 19 is a front view of a yet further bar supporting apparatus.
Figure 20:
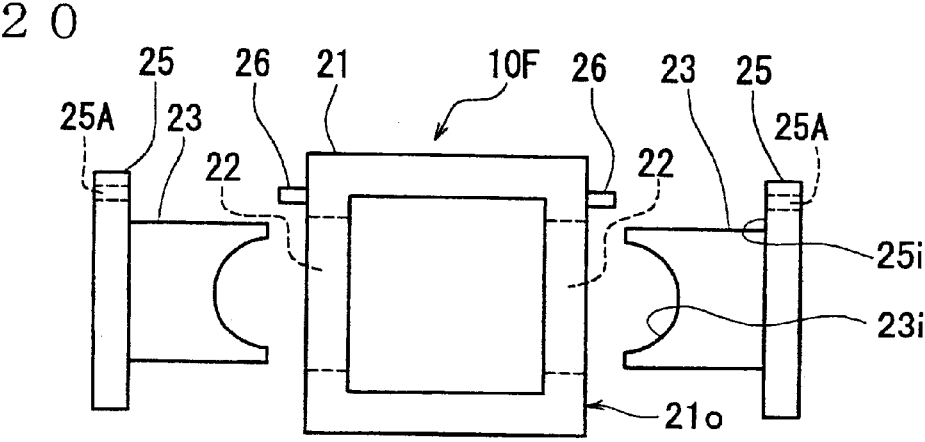
FIG. 20 is an exploded plan view of the bar supporting apparatus of FIG. 19.
Figure 21:
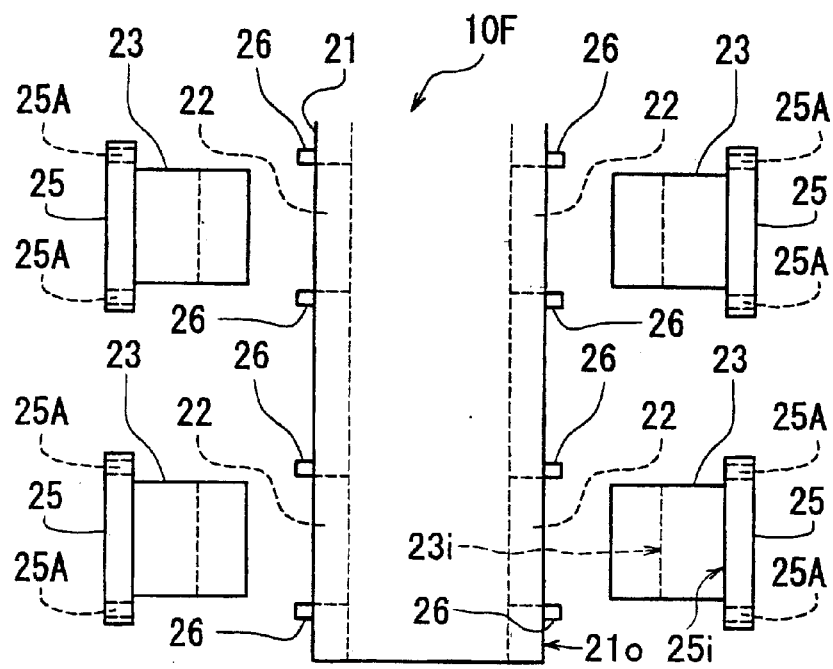
FIG. 21 is an exploded plan view of the bar supporting apparatus of FIG. 19.

Yet another bar supporting apparatus 10F will now be explained with reference to FIGS. 19 to 21. In the drawings, reference numeral 21 denotes a case; 23, a support; and 25, a fixing member. The case 21 has a predetermined prismatic shape with each surface being flat and its material, length or others is similarly constituted as the case 11 illustrated in FIGS. 1 to 5. Through holes 22 into which each support 23 can be inserted are formed on one surface side along the longitudinal direction of the case 21 at predetermined intervals, and on the other surface side of the case 21, through holes 22 having the same shape and size as the through holes 22 formed on the above-described surface side are formed in the opposite manner.

Further, the external surface of the support 23 has a flat surface having the substantially same shape as the external surface of the case 21, and the bearing surface has a bent surface slightly larger than the external surface of the bar 17. In addition, the internal surface of the fixing member 25 is formed into a flat surface having the substantially same shape as the external surface of the case 21 and has a shape slightly larger than the through hole 22. The external surface of the support 23 is fixed to the internal surface 25i of the fixing member 25 by a non-illustrated screw, and the fixing member 25 is fixed to the case 21 by a non-illustrated screw with the support 23 being inserted into the through hole 22.

The supporting portion 14 having a shape slightly larger than the predetermined bar 17 is formed by bearing surfaces 23i of the opposed supports 23 with the fixing member 25 to which the support 23 is provided being fixed to each through hole 22 of the case 21. Further, a positioning pin 26 is disposed at a predetermined position on both external surfaces of the case 21, and a positioning hole 25A is formed at a position on the fixing member 25 corresponding to the positioning pin 26. When the positioning pin 26 is inserted into the positioning hole 25A, the fixing member 25 is positioned at a predetermined location of the case 21. Consequently, the axial center of each supporting portion 14 formed by the supports 23 from the opposed both surfaces of the case 21 can be accurately matched with the same axial center.

In this manner, the external surface of the support 23 and the internal surface of the fixing member 25 are flat surfaces substantially equal to the external surface of the case 21, and the bearing surface of the support 23 is set out with the external surface of the case 21 being used as a reference. Consequently, the axial center of each supporting portion 14 which is formed by the opposed supports 23 at predetermined intervals in the longitudinal direction of the case 21 can be accurately matched with other counterparts by, for example, processing the external surface of the case 21 into the accurate flat surface. Therefore, the gap between the supporting portion 14 and the bar 17 can be minimized, and the oscillation of the rotating bar 17 can be greatly suppressed.

Figure 22:
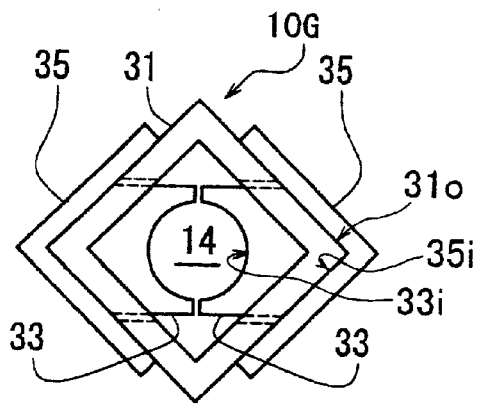
FIG. 22 is a front view of another bar supporting apparatus.
Figure 23:
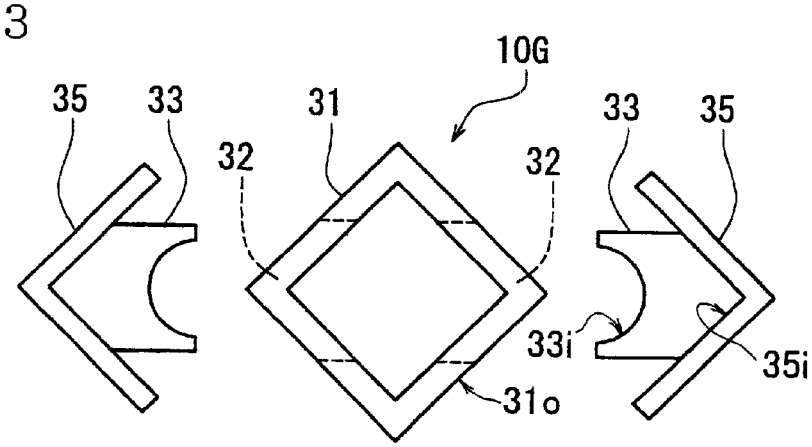
FIG. 23 is an exploded front view of the bar supporting apparatus depicted in FIG. 22.
Figure 24:
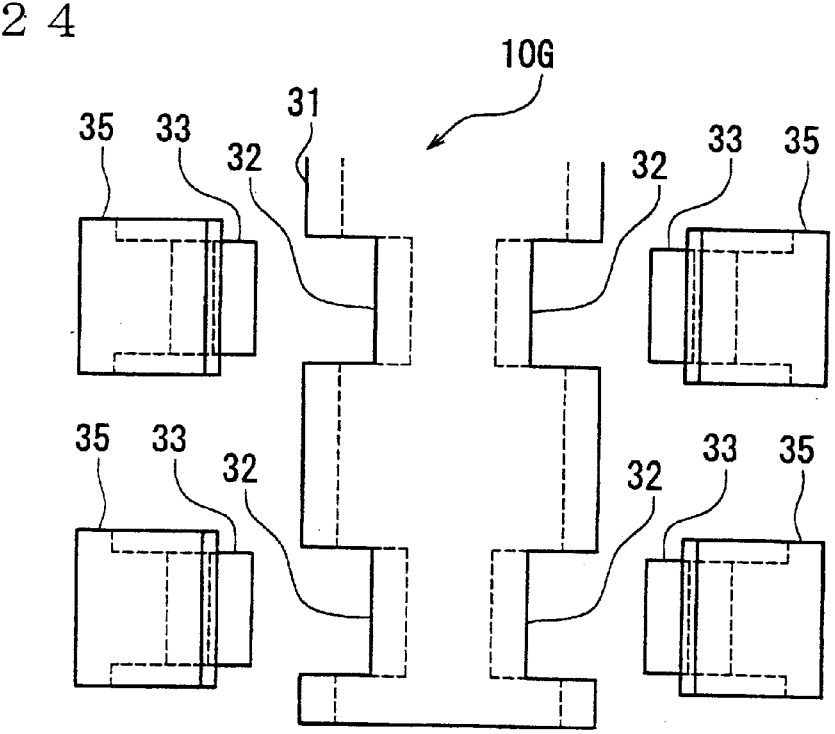
FIG. 24 is an exploded plan view of the bar supporting apparatus of FIG. 22.

A further bar supporting apparatus 10G is described with reference to FIGS. 22 to 24. In the drawing, reference numeral 31 designates a case; 33, a support; and 35, a fixing member. The case 31 has a predetermined prismatic shape, and its material, length or others is similarly constituted as the case 11 depicted in FIGS. 1 to 5. Further, each through hole 32 is formed to opposed angular portions of the case 31, and the through hole 32 has a size allowing the support 33 to be inserted therethrough.

The external surface of the support 33 protrudes in a shape substantially equal to that of an angular portion external surface 31o of the case 31, and the bearing surface of the support 33 is formed into a bent shape which is slightly larger than the external surface of the bar 17. An internal surface 35i of the fixing member 35 is concaved so as to be substantially fitted to the angular portion external surface of the case 31, and the fixing member 35 is formed into a shape which is slightly larger than the through hole 32. The external surface of the support 33 is fixed on the internal surface of the fixing member 35, and the fixing member 35 is fixed to the case 31 by a non-illustrated screw with the support 33 being inserted into the through hole 32.

Subsequently, the support 33 is inserted into the each through hole 32, and the fixing member 35 is fixed to the case 31. In this state, the bearing surfaces 33*i* of the opposed supports 33 form the supporting portion 14. That is, the axial center of each supporting portion 14 is positioned with the external surface forming the corner portion of the case 31 as a reference. The axial center of the case 31 using the external surface forming the angular portion as a reference and the axial center of each supporting portion 14 formed by the opposed supports 33 can be accurately matched with the same axial center.

In this manner, the through hole 32 is formed at the angular portion of the case 31 formed into a prismatic shape, the external surface of the support 33 protrudes in a shape substantially equal to that of the external surface of the angular portion of the case 31, and the internal surface of the fixing member 35 is concaved in a shape which can be substantially fitted to the external surface of he angular portion of the case 31. Therefore, the axial centers of the respective supporting portions 14 can be accurately matched with each other with the external surface of the angular portion of the case 31 being used as a reference. As a result, the bar 17 can be supported so as to minimize the oscillation of the bar 17 from the axial center of each supporting portion 14 formed by the bearing surfaces of the opposed supports 33. Accordingly, for example, by finishing the external surface of the case 31 in such a manner that the axial center of the case 31, the external surface forming the angular portion in particular has the high accuracy, the axial center accuracy can be significantly improved so that the axial centers of the respective supporting portions 14 formed by the opposed supports 33 which are formed in the longitudinal direction of the case 31 at predetermined intervals can be the same straight axial center.

Figure 25:
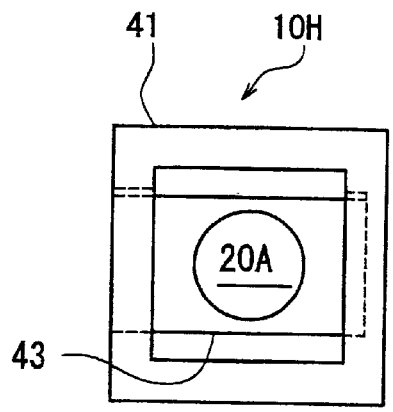
FIG. 25 is a front view of still another bar supporting apparatus.
Figure 26:
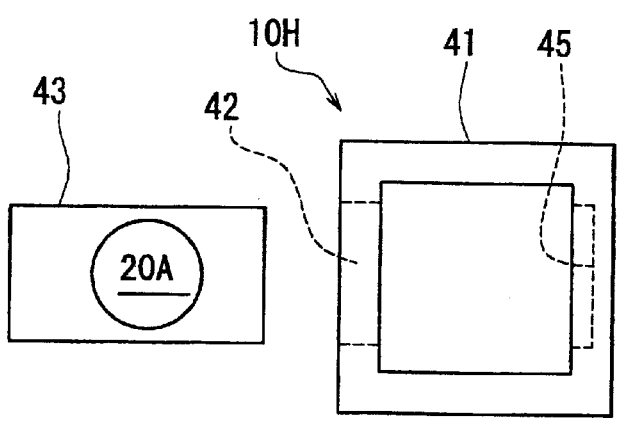
FIG. 26 is an exploded front view of the bar supporting apparatus of FIG. 25.
Figure 27:
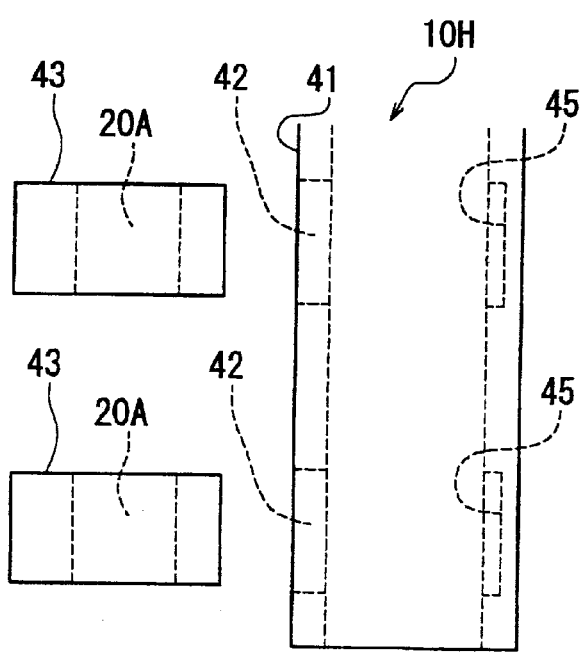
FIG. 27 is an exploded plan view of the bar supporting apparatus of FIG. 25.
Figure 28:
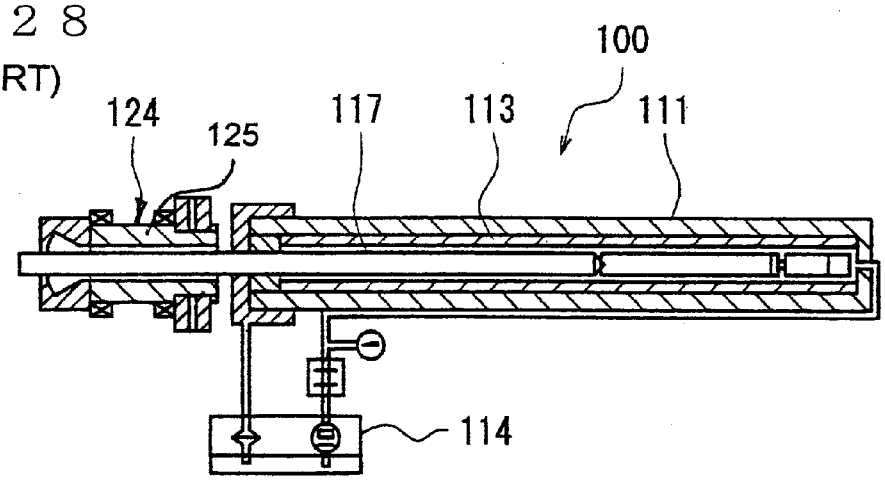
FIG. 28 is a central longitudinal sectional plan side view of a prior art bar supporting apparatus.
Figure 29:
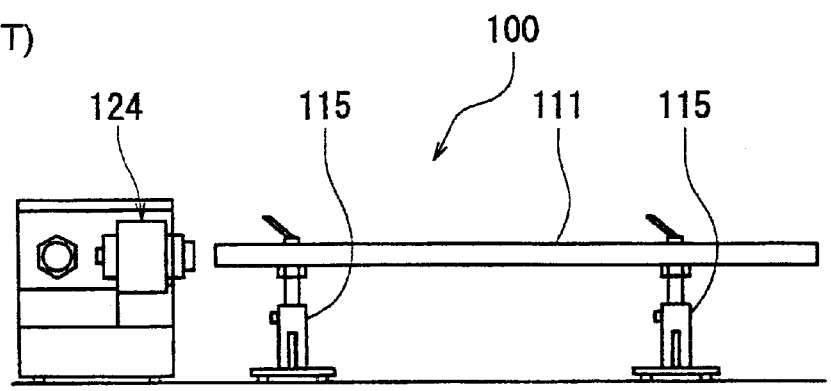
FIG. 29 is a side view of the bar supporting apparatus illustrated in FIG. 28.
Figure 30:
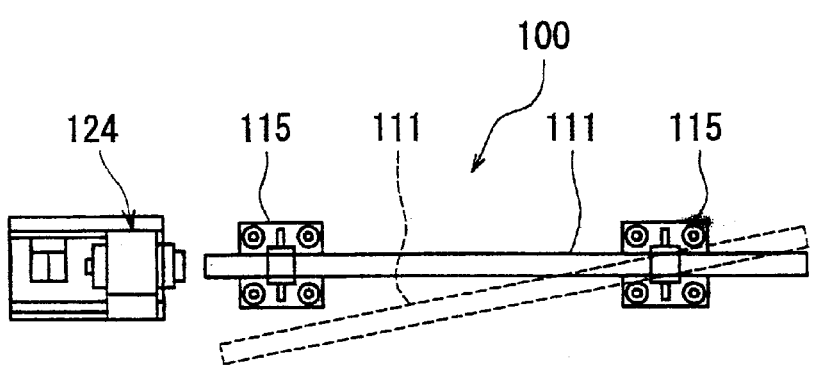
FIG. 30 is a plan view showing the moving state of a case of the bar supporting apparatus depicted in FIG. 28.
Figure 31:
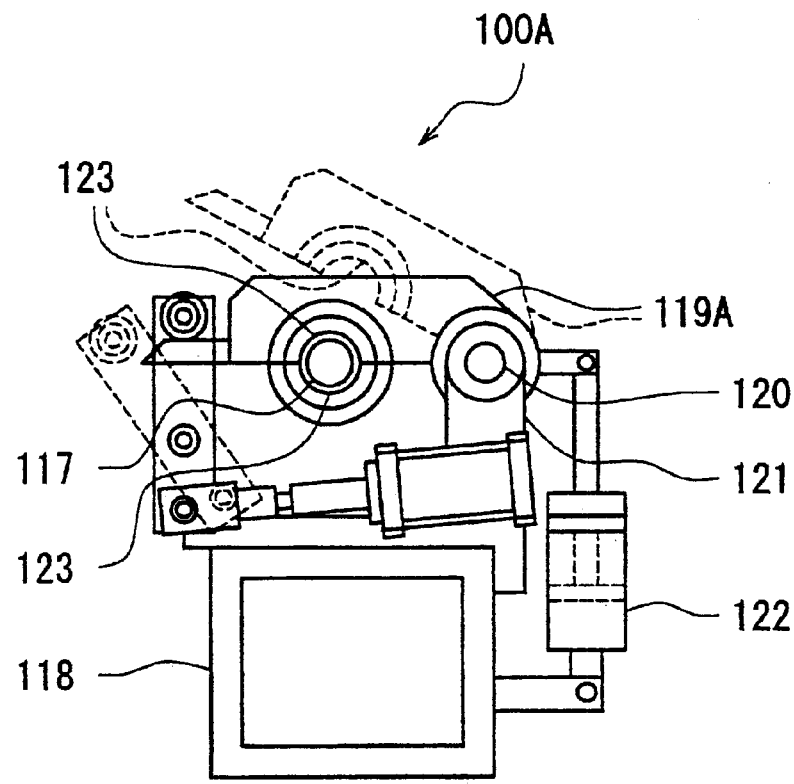
FIG. 31 is a front view showing another prior art bar supporting apparatus.
Figure 32:
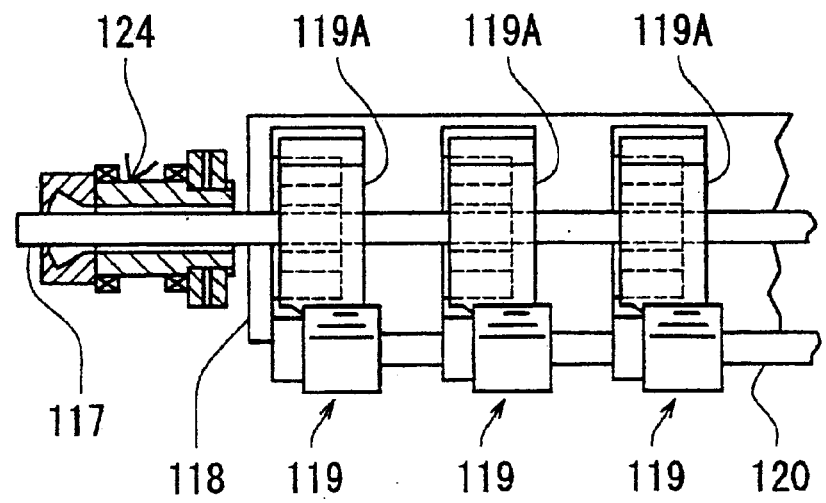
FIG. 32 is a plan view partially showing the bar supporting apparatus of FIG. 31.

Another bar supporting apparatus 10H will now be explained in conjunction with FIGS. 25 to 27. In the drawings, reference numeral 41 denotes a case; 43, a support; and 42, a through hole. The case 41 has a predetermined prismatic shape, and its material, length and others are similarly constituted as the case 11 shown in FIGS. 1 to 5 and the case 21 illustrated in FIGS. 19 to 21. Further, through holes 42 are formed on one side surface of the case 41 at predetermined intervals, and this through hole 42 is formed to have a size allowing insertion of the support 43 therethrough.

Moreover, a fixing portion concaved from the inner surface for fixing the side surfaces and the end of the support 43, i.e., a fixing surface 45 is formed on the inner surface of the case 41 at a position opposed to the through hole 42 formed on one side surface of the case 41. This fixing surface 45 enables the external surface of the side surface of the case 41 to be formed as a flat surface or a reference surface, and the fixing surface 45 and the side surface of the through hole 42 can cause the flat surface or the reference surface to be formed with the substantially same accuracy as that of the external surface because the fixing surface 45 is processed from the outer side of the side surface of the case 41, i.e., via the through hole 42. The fixing surface 45 formed by such a method is formed in a size which is substantially equal to the through hole 42.

Further, the supporting portion 20A is formed to the support 43, and the supporting portion 20A is so formed as to be slightly larger than the external surface of the bar 17, as similar to the above-described support 13 shown in FIGS. 1 to 5. The end of the support 43 is fixed to each fixing surface 45 of the case 41, and the side surface of the support 43 is fixed to the one side surface of each fixing surface 45. In this state, the axial centers of the respective supporting portions 20A formed to the supports 43 are accurately matched to the same axial center. In this case, any one side of the support 43 may be brought into contact with the through hole 42 and the fixing surface 45 so that the accuracy of the axial center of each supporting portion 20A can be improved with the same straight axial center. This can cause each supporting portion 20A to support the bar 17 to minimize the oscillation.

As described above, since the fixing surface 45 for fixing the end of the support 43 is formed on the internal surface of the case 41 at a position opposed to the through hole 42, the axial center of each supporting portion 20A can be accurately matched with the same axial center, as completely similar to the case where the external surface of the case 41 is used as a reference. As a result, the bar 17 can be supported so that the oscillation of the bar 17 from the axial center of each supporting portion 20A can be minimized.

Incidentally, that the dimensions described in the foregoing embodiments are not restricted to thereto and larger or smaller dimensions may be employed if only the axial center of each supporting portion 14 or 20A can be accurately matched with the same axial center from the external surface or the reference surface of the case 11, 21, 31 or 41.

It is to be noted that the above embodiments are the preferred modes for embodying the present invention but not restricted thereto, and various modifications are possible without departing from the scope of the present invention.

What is claimed is:

1. A bar supporting apparatus for an automatic lathe, the apparatus being gripped by a chuck of a main spindle of said automatic lathe and preventing a rotating bar from oscillating at a rear of said main spindle, comprising:

a tubular case into which said bar is inserted, along a longitudinal direction;

a plurality of supports for supporting said bar;

a fixing member fixed to each support for fixing said supports to said case, each fixing member having an internal surface concaved with a curvature substantially matched with an external surface of said case;

means for fixing said supports with fixing members to said case;

said case having a through hole for each support and into which each respective support is inserted, each through hole having a finite axial and circumferential extent for accommodating each support and said supports being fixed into said case for bringing the internal surface of said fixing member into contact with the external surface of said case to fix each fixing member to said case when said supports are inserted into said case through said through holes, and positioning of an internal surface of each support adjacent the bar being performed with the external surface of said case as a reference.

2. The bar supporting apparatus for an automatic lathe according to claim 1, wherein said fixing member and said support can be separated, the internal surface of each fixing member is concave with a curvature which is substantially matched with the external surface of said case, and an external surface of each support is bent with a curvature equal to that of the external surface of said case.

3. The bar supporting apparatus for an automatic lathe according to claim 2, wherein the internal surface of each support has a semicircular shape which is slightly larger than that of said bar and is formed on a coaxial alignment with the external surface of each support, and the internal surface of each fixing member and the internal surface of each support has the same axial center.

4. The bar supporting apparatus for an automatic lathe according to claim 1, wherein a protrusion for engagement is formed on the internal surface of each fixing member and a groove is formed in the external surface of said case for engaging with said protrusion, so that positioning of each fixing member with respect to said case in an axial direction is performed.

5. The bar supporting apparatus for an automatic lathe according to claim 1, wherein a protrusion for engagement is formed on the internal surface of said fixing member and a groove is formed in the external surface of said case for engaging with said protrusion, and a groove is formed in the external surface of each support for engaging with said protrusion.

6. The bar supporting apparatus for an automatic lathe according to claim 1, wherein said through holes are formed on opposed side surfaces of said case and said respective supports are inserted into said case from said through holes to support said bar from both sides of said bar.

7. The bar supporting apparatus for an automatic lathe according to claim 6, further comprising:
   a notch which is formed along a longitudinal direction of said case and notched so as to allow insertion of said bar;
   a bar pedestal provided slightly below a position where said bar is supported by said supports; and
   cylinders which support said supports and said fixing members, allow said supports to freely enter or leave said case and hold said bar supplied on said bar pedestal, and bring said fixing members into contact with the external surface of said case.

8. The bar supporting apparatus for an automatic lathe according to claim 1, wherein an internal surface of said case has at a position opposed to said one through hole, a fixing portion having a recessed shape so as to fix side surfaces and an end of each support.

9. The bar supporting apparatus for an automatic lathe according to claim 1, wherein said through holes are formed on opposed side surfaces of said case, each support is inserted in said case from one of said through holes to the other, and a supporting position into which said bar is inserted is formed to said supports.

10. The bar supporting apparatus for an automatic lathe according to claim 1, wherein one of said through holes is formed on one side surface of said case, each support is inserted into said case from said one through hole, and a supporting portion into which said bar is inserted is formed to said supports.

11. The bar supporting apparatus for an automatic lathe according to claim 1, wherein a plurality of said through holes are formed in parallel to the longitudinal direction of said case.

12. The bar supporting apparatus for an automatic lathe according to claim 11, wherein a plurality of said through holes are formed on the surface of said case along the longitudinal direction thereof, angles of said respective through holes seen from a center of said case are shifted from each other, and said respective supports are inserted in said case from said through holes to support said bar.

13. The bar supporting apparatus for an automatic lathe according to claim 1, wherein an elastic member is provided between each fixing member and each support.

* * * * *